July 24, 1962  H. M. FLEMING, JR  3,045,903
MAGNETIC DIAL READING APPARATUS
Filed July 8, 1958  2 Sheets-Sheet 1
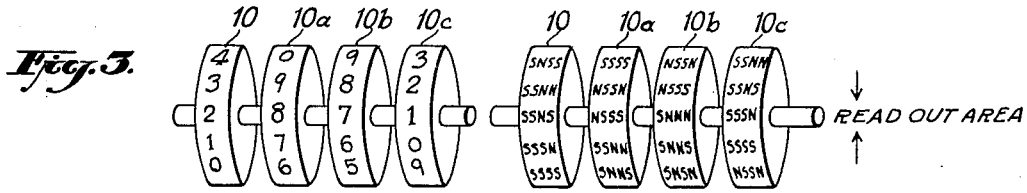
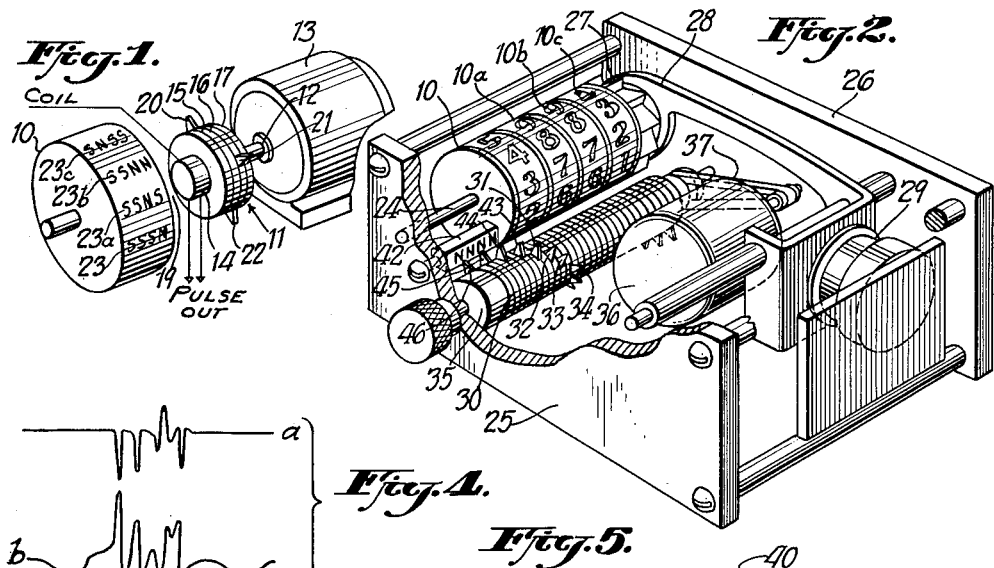
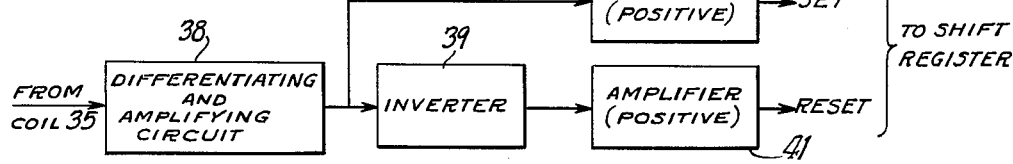
INVENTOR
HOWARD M. FLEMING JR.
BY
Ward, Neal, Haselton, Orme & McChannon
ATTORNEYS July 24, 1962 H. M. FLEMING, JR 3,045,903
MAGNETIC DIAL READING APPARATUS
Filed July 8, 1958 2 Sheets-Sheet 2
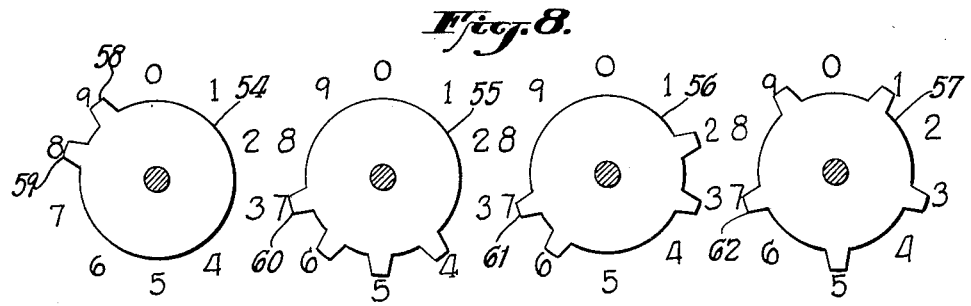
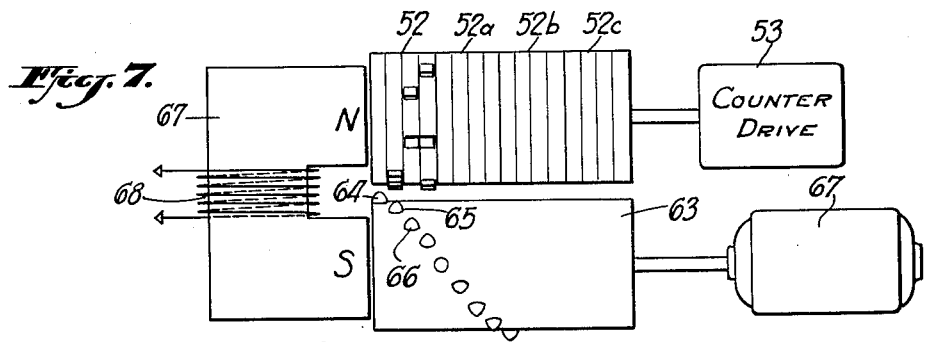
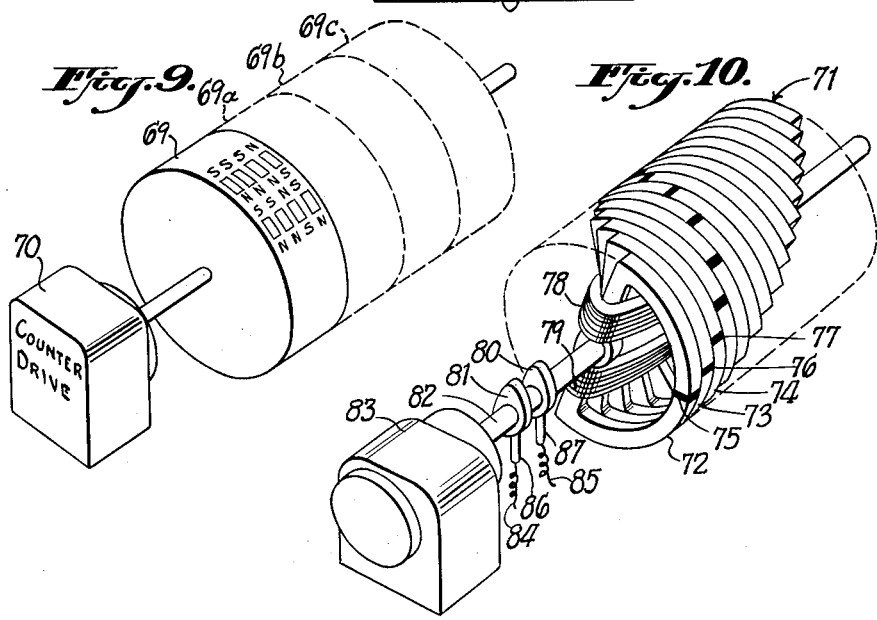
INVENTOR
HOWARD M. FLEMING JR.
BY
ATTORNEYS.

United States Patent Office 3,045,903
Patented July 24, 1962

3,045,903
MAGNETIC DIAL READING APPARATUS
Howard M. Fleming, Jr., Basking Ridge, N.J., assignor, by mesne assignments, to Electro-Mechanical Research, Inc., Sarasota, Fla., a corporation of Connecticut
Filed July 8, 1958, Ser. No. 747,142
18 Claims. (Cl. 235—61)

This invention relates to apparatus for generating electrical signals representing the position of a movable member and particularly to electrical apparatus for reading mechanical counters without the use of mechanical coupling therebetween.

Measuring apparatus having one or more members which are movable to different positions dependent upon the magnitude of the characteristic being measured, e.g. the force, rate, number, etc., are well known, and it is known also to generate electrical signals dependent upon the positions of such members so that electrical devices may be operated thereby or so that a remote indication of the magnitude may be provided. However, the known systems are unsatisfactory for many applications because they require mechanical coupling between the measuring apparatus and the signal generating apparatus or because they cannot be readily adapted to operate with existing measuring apparatus. When mechanical coupling is required, the driving force which operates the measuring apparatus may be inadequate and/or the added load may cause errors in the measurement. When space is limited or when the positions of a plurality of members, for example, with a counter having a plurality of cylinders or dials indicate the magnitude of a measurement, certain known systems cannot be employed or cannot be used for remote indication over a single communication channel.

The apparatus of the invention is particularly adapted for use in the remote reading of electrically or mechanically operable mechanical counters having a plurality of mechanically coupled rotatable cylinders or dials which may be driven by a common shaft and which rotate stepwise or otherwise, each cylinder representing a higher place digit of a number rotating stepwise or otherwise through a portion of a revolution for each complete revolution of the cylinder representing the next lower place digit of the number. Such counters are well known in the art and are used as message counters, tally counters, gas and electricity consumption counters, mileage counters, etc.

In the apparatus of the invention, a magnetic member having different magnetic characteristics in different portions thereof is movable in accordance with the value of the characteristic being measured, and a read-out member also having different magnetic characteristics in different portions thereof is mounted adjacent the magnetic member. Either one of the members may include means for producing a magnetic field or separate means may be provided for producing a magnetic field extending through the members, and a read-out coil is mounted in the path of the field so that movement of one of the members will affect the field passing through the coil and will produce electrical signals therein. When read-out is desired, one of the members is moved by a driving means, such as an electric motor, to produce signals corresponding to the position of the magnetic member. In general, it is not feasible to rotate the magnetic member, and therefore, the read-out member usually is the driven member.

In the preferred embodiment of the invention, the magnetic characteristics of the magnetic member are arranged in spaced patterns or groups each of which produces a group of signals indicating the pattern or group moved into a predetermined position by the magnetic member. For example, if each position of the member is to be represented by a digit, the member may have spaced groups of areas of different magnetic characteristics, e.g. permeability or polarity, each group comprising a plurality of areas arranged in binary form and each group comprising four areas if the member has ten positions.

In accordance with one embodiment of the invention, the magnetic member is made of magnetic material and has a plurality of projections of such material extending therefrom. The magnetic member may, for example, be made of a plurality of steel discs mounted coaxially and having projections extending from the periphery thereof. The number and spacing of the projections is arranged so that with respect to a predetermined "read-out" position, the number and arrangement of the projections varies with movement of the magnetic member so that each position of the magnetic member provides a different arrangement and/or number of projections at such predetermined position. The position of the magnetic member is determined by the magnitude or other value of the characteristic being measured, and a read-out member, also of magnetic material, is mounted adjacent the magnetic member. The read-out member has a plurality of magnetic projections extending therefrom and is movable by any suitable driving means, such as an electric motor. The projections on the read-out member are arranged so that each projection passes successively adjacent a projection, or a space between projections, on the magnetic member. A permanent magnet surrounded by a read-out coil is disposed adjacent both members so that the magnetic field passes at least in part through the members and the projections thereon and so that the reluctance of the magnetic field is varied, when the read-out member is rotated, in accordance with the pattern or arrangement of the projections on the magnetic member scanned by the projections on the read-out member. In accordance with a modified form of this embodiment, the projections on the magnetic member are magnetically polarized in predetermined patterns.

In accordance with another embodiment of the invention, the magnetic member is made of magnetic material or is coated with a magnetic material, such as the magnetic oxides employed on conventional magnetic recording tapes, and spaced groups of individual areas are magnetically polarized in the direction of movement of the member, the areas in each group being polarized in predetermined patterns. As in the previous embodiment, the position of the magnetic member is varied by the magnitude or other value of the characteristics being measured. The read-out member comprises a plurality of magnetic reproducing heads having one or more read-out coils coupled thereto and having gaps which are spaced with respect to each other so that the gaps may be brought successively into positions adjacent the polarized areas of a group. The reproducing heads are rotatable by any suitable driving means, such as an electric motor.

In accordance with another embodiment of the invention, the magnetic member is made of magnetic material or is coated with magnetic material, and groups of individual areas are magnetically polarized in predetermined patterns. The read-out member is made of magnetic material and has a plurality of magnetic projections thereon which are arranged so that they may be brought successively into positions adjacent the individual areas of a group, the read-out member being driven by any suitable driving means. A read-out coil is coupled to the read-out member so that it is within the magnetic field of the polarized areas, the magnetic field being variable by the projections on the read-out member as the read-out member is rotated.

It is one object of the invention to provide apparatus for generating electrical signals corresponding to the position of a magnetic member forming part of measuring apparatus without the use of mechanical coupling between the magnetic member and the electrical apparatus.

It is another object of the invention to provide relatively simple apparatus for reading counters remotely and which may be readily adapted for use with counters in existing installations.

Other objects and advantages of the invention will be apparent from the following detailed description of the manner in which I now prefer to practice the invention, which description should be considered in connection with the accompanying drawings in which:

FIG. 1 is a diagrammatic, perspective view of one embodiment of the invention;

FIG. 2 is a partially cut-away, perspective view of a preferred embodiment of the invention;

FIG. 3 is a diagrammatic view of counter dials constructed in accordance with the invention;

FIG. 4 shows wave forms of the ouput signals obtained with the apparatus shown in FIG. 2 and wave forms of such signals after being differentiated;

FIG. 5 is a block diagram of electrical apparatus which may be used with the embodiment shown in FIG. 2 for the purpose of operating a conventional shift register;

FIG. 6 shows wave forms of the signals obtained in the various parts of the apparatus shown in FIG. 5;

FIG. 7 is a diagrammatic showing of another embodiment of the invention;

FIG. 8 is a side elevation view of discs forming part of the apparatus shown in FIG. 7;

FIG. 9 is a perspective view of another embodiment of the magnetic member of the invention; and FIG. 10 is a perspective view of a read-out member which may be employed with the magnetic member shown in FIG. 9.

In FIG. 1, a magnetic member 10, such as a cylindrical counter dial which is movable in accordance with the value of the quantity being measured, is mounted adjacent a magnetic read-out member 11 which is mounted on the shaft 12 of an electric motor 13. A stationary read-out coil 14 is mounted adjacent one end of the read-out member 11 and coaxially with the shaft 12, and the read-out member 11 comprises a plurality of discs 15–18 each having magnetic projections 19–22 thereon, the discs 15–18 being positioned with respect to each other so that the projections 19–22 are axially and circumferentially spaced with respect to each other and so that when the shaft 12, and hence, the member 11 is rotated, the projections 19–22 successively pass adjacent a predetermined, axially extending portion 23 of the magnetic member 10. The spacing between the ends of the projections 19–22 and the portion 23 as the projections 19–22 pass the portion 23 is less than the axial spacing of the projections and, preferably, is much less than the axial spacing.

As indicated in FIG. 1 by the letters "S" and "N," the portion 23 comprises a plurality of magnetically polarized areas. The member 10 may be made of magnetizable material, e.g. magnet steel, ferroceramic or soft iron coated with a thin peripheral layer of a magnetic oxide, and the magnetically polarized areas may be produced on the surface thereof in a known manner. Alternatively, the member 10 may comprise a central core of a material of high permeability and low retentivity, such as soft iron, having groups of permanent magnets, oriented so as to present the pole faces indicated in FIG. 1, protruding therefrom, the spaces between the projecting ends preferably being filled with a non-magnetic material, e.g. a synthetic resin, so as to provide a smooth exterior surface for the member 10. Thus, the polarization of the areas of the portion 23 represents the numeral 2 in binary code as shown by the following table which sets forth the binary equivalents for the decimal numbers 0–9.

Table I

| Decimal No. | Binary Equivalent | Polarized Equivalent | |
|---|---|---|---|
| | | Axial | Peripheral |
| 0 | 0000 | S S S S | S S S S / N N N N |
| 1 | 0001 | S S S N | S S S N / N N N S |
| 2 | 0010 | S S N S | S S N S / N N S N |
| 3 | 0011 | S S N N | S S N N / N N S S |
| 4 | 0100 | S N S S | S N S S / N S N N |
| 5 | 0101 | S N S N | S N S N / N S N S |
| 6 | 0110 | S N N S | S N N S / N S S N |
| 7 | 0111 | S N N N | S N N N / N S S S |
| 8 | 1000 | N S S S | N S S S / S N N N |
| 9 | 1001 | N S S N | N S S N / S N N S |

For example, if the magnetic member 10 has ten different positions, each position representing a different decimal digit, there will be ten different portions 23, 23a, 23b, 23c, etc. spaced equally about the circumference of the member 10, each portion comprising a group of four areas polarized as set forth in the third column of Table I.

In the preferred form of the invention, the polarized areas of the portion 23 are polarized in accordance with a binary code so as to represent the digits normally appearing on the face of the magnetic member 10 although it will be understood that other patterns or codes may be used.

As pointed out above, the projections 19–22 on the read-out member 11 are positioned so that they pass successively adjacent the portion 23 when the member 11 is rotated. Therefore, it will be apparent that the projections 19–22 are located along a spiral path on the periphery of the read-out member 11 and if the member 11 is rotated counter-clockwise, as viewed from the left end in FIG. 1, the projection 19 will pass adjacent the left hand area labeled "S," the projection 20 will then pass adjacent the next area labeled "S," the projection 21 will then pass adjacent the next area labeled "N" and the projection 22 will then pass adjacent the next area (the extreme right area) labeled "S." Since the read-out coil 14 is within the paths of the magnetic fields of the polarized areas, an electrical pulse will be induced in the coil 14 each time that a projection 19–22 passes adjacent a polarized area. This electric pulse is induced in winding 14 because the flux linking with winding 14 undergoes a variation dependent upon the relative rotation of members 10 and 11. The amount of flux emanating from a magnetized area on portion 23, for example, which links with winding 14 depends upon the reluctance of the closest air gap betwen the coded member 10 and the relatively high permeability search drum 11: whenever one of the search teeth 19–22 is directly opposite to a magnetized area, the air gap's reluctance becomes relatively low and, consequently, more flux links with winding 14, thereby inducing therein a relatively large amplitude signal the polarity of which depends upon the polarity of the emanating flux. Conversely, when a search tooth is not directly adjacent to a magnetized area, the air gap's reluctance is relatively high, the flux linking with winding 14 is relatively low and, consequently, the signal induced in winding 14 is of relatively low amplitude. In one complete revolution of the read-out member 11, there is generated in winding 14 a series of binary "1" and "0" pulses dependent upon the coded polarity of the magnetized areas on the portion 23 being read out. For example, the wave form in the lower portion of FIG. 4 illustrates the electrical pulses induced in the coil 14 during one cycle of rotation of the read-out member 11, the portion 23 and, hence, the pulses represented by the wave form in the lower portion of FIG. 4, corresponding to the decimal digit 2.

If the magnetic member 10 is rotated to a different position from that shown in FIG. 1 so that a new group of polarized areas is in the position of the portion 23 ("read-out" position), then a different group of pulses corresponding to the polarization of the new group of areas in the position of the portion 23 will be produced in the read-out coil 14 when the read-out member 11 is rotated. It will be apparent from the above that the signals induced in winding 14 by the peripherally displaced magnetized areas and by the axially displaced magnetized areas in the first, second, third and fourth peripheral tracks are relatively insignificant in comparison with the signal induced in winding 14 by the magnetized area directly opposite and adjacent to a search tooth. For example, when lug 19 moves past the magnetized area "S" of the first peripheral track on portion 23, the output pulse in winding 14 has a relatively high amplitude in the negative direction because the spacing between lug 19 and this magnetized area is then on the order of only a few thousandths of an inch or less, whereas the respective spacings between the next adjacent peripherally and axially magnetized areas are relatively much greater and, consequently, no appreciable signals will be induced in winding 14 by such neighboring magnetized areas, as clearly shown by the waveforms in FIG. 4.

The embodiment shown in FIG. 1 may be modified to read-out a plurality of magnetic members and a preferred embodiment of the invention in shown in FIG. 2. In FIG. 2 a plurality of dials 10–10c, which are mechanically coupled in any conventional manner and, preferably, are mechanically coupled so that each dial representing a higher place in a number moves stepwise a portion of a revolution for each complete revolution of the dial representing the next lower place of a number, are mounted on a shaft 24 supported at its ends by plates 25 and 26 forming part of the supporting frame. The dials 10–10c may, for example, be employed to register the number of message units chargeable to a telephone customer. Each of the dials 10–10c has a plurality of groups of polarized areas on the periphery thereof corresponding to the digits shown on the periphery of the dials in FIG. 2 arranged as described in connection with FIG. 1 and as set forth in Table I. The polarized areas and the corresponding digits are shown diagrammatically in greater detail in FIG. 3.

The dials 10–10c are rotatable by means of a ratchet 27 and a ratchet arm 28, which arm 28 is operable by a solenoid 29 which may be energized in any conventional manner. For example, the solenoid 29 may be connected to a known type of telephone circuit in which the solenoid 29 is energized for each message unit to be charged to a telephone customer.

A read-out member 30, which may be constructed in the same manner as a read-out member 11 shown in FIG. 1, is mounted with its axis of rotation substantially parallel to the axis of rotation of the dials 10–10c and is rotatable by the electric motor 36 which is coupled to the member 30 by a belt 37. When the member 30 is rotated, the projections 31, 32, 33, 34, etc., which are equal in number to the number of polarized areas on the members 10–10c (sixteen, in the embodiment shown in FIG. 2), pass successively adjacent the portions of the dials 10–10c which are in the read-out position. Thus, as shown in FIG. 2, the first four projections 31–34, will pass adjacent the group of four areas on the portion of the dial 10 labeled "2," the next four projections will then successively pass adjacent the group of four areas on the portion of the dial 10a labeled "6," etc. A stationary read-out coil 35 mounted at the end of the read-out member 30 will have electrical pulses induced therein when the read-out member 30 is rotated, and the pulses will be generated in time spaced groups, the pulses in each group corresponding, in binary form, to the digit on a dial in read-out position.

The wave form in the lower portion of FIG. 4 is a drawing of the wave form observed on an oscilloscope of the output signal of the embodiment shown in FIG. 2 for the digit 2, and the upper wave form in FIG. 4 illustrates the pulses obtained after the output signal has been differentiated.

For tabulation and computation purposes, the embodiment of FIG. 2 may be connected to a conventional shift register by means of the circuits represented by the block diagram in FIG. 5. Thus, the coil 35 may be connected to a differentiating and amplifying circuit 38, the output of which is connected to the input of an inverter 39 and an amplifier 40. The inverter 39 changes the relative polarity of the pulses supplied thereto and supplies the inverted pulses to the input of an amplifier 41. Both amplifiers 40 and 41 amplify only positive-going pulses, and therefore, these amplifiers supply positive pulses at their output for the operation of the shift register.

FIG. 6 illustrates the wave forms of the read-out signals and the pulses at the various portions of the circuit shown in FIG. 5. For the purpose of providing a signal which indicates the beginning of read-out, the embodiment shown in FIG. 2 may be provided with a stationary magnetic member 42 and auxiliary magnetic projections 43–46. The portion of the magnetic member 42 facing the read-out member 30 has four areas spaced axially of the read-out member 30 and all similarly polarized, the areas having a north or "N" polarity. When the motor 36 is energized to cause rotation of the read-out member 30, coil 35 will first have induced therein a group of four pulses whose wave form is illustrated at 47 in FIG. 6. If it is assumed that the dials 10–10c are set so that the numbers 2583 are in the read-out position, then the signals having the wave forms at the left of the wave forms 47 in FIG. 6 will be induced successively in time in the read-out coil 35.

When the signals supplied by the coil 35 to the input of the differentiating and amplifying circuit 38 are modified by the circuit 38, the output signals of the circuit 38 will have the wave forms indicated at 48 in FIG. 6. After the output signals of the circuit 38 have been inverted by the inverter 39, they will have the wave forms indicated at 49 in FIG. 6. The output signals or pulses of amplifiers 40 and 41 will have the wave forms indicated at 50 and 51 respectively in FIG. 6.

It will be apparent from the foregoing description of the preferred embodiment of the invenion that the magnetic members 10–10c which are movable in accordance with the value of the quantity to be measured have no mechanical coupling with the read-out member 30 and that the output signals provided by the read-out coil 35 will have characteristics dependent upon the positions to which the dials 10–10c are moved by the value of the quantity being measured. Although, due to the magnetic coupling between the read-out member 30 and the magnetic members 10–10c there will be a relatively small force applied to the magnetic members 10–10c during rotation of the read-out member 30, it will be apparent that it is not necessary to rotate the read-out member 30 continuously. Instead, the read-out member 30 may be rotated only during the read-out period, and therefore, the load on the magnetic members 10–10c may be limited to a period of short duration and may be limited to a time when the members 10–10c are stationary.

It will be obvious to those skilled in the art that the projections 19–22, 31–34, etc. and/or the projections 43–46 may be magnetized also, the projections all having the same polarity, without changing the operation of the embodiments shown in FIGS. 1–6. Similarly, a permanent magnet with an associated read-out coil of the type described hereinafter in connection with FIG. 7 may be used in place of the read-out coil 35 to increase the strength of the magnetic field.

It will be apparent from the foregoing description of the preferred embodiment of the invention that an output signal is provided for each of the projections 31, 32, 33, 34, etc. of the read-out member 30 so that the absence of a signal will indicate improper operation of the read-out apparatus. In other words, no place of the binary code is indicated by the absence of a signal, and therefore, the embodiments shown in the preceding figures may be made reliable in operation and may be used with apparatus which will provide an indication of defective operation.

However, it is also possible to employ the invention in connection with magnetic members in which a place of the binary code is indicated by the absence of a signal. One such embodiment of the invention is illustrated in FIGS. 7 and 8.

In FIG. 7 the magnetic members 52–52c are each of identical construction and may be mechanically coupled in the same manner as the magnetic members 10–10c. The magnetic members 52–52c are driven by any suitable device, such as the counter drive 53 which is controlled by the value of the quantity to be measured. The counter drive 53 may, for example, be the same as the counter drive 27–29 illustrated in FIG. 2.

Each of the magnetic members 52–52c comprises a plurality of magnetic discs 54–57 illustrated in FIG. 8. The discs 54–57 are made of magnetic material and, preferably, are made of a material such as high permeability iron or steel which has a low retentivity, polarization of areas of these discs being unnecessary in this embodiment. On the other hand, the projections on the discs 54–57, hereinafter described, may all be magnetized with the same polarity if desired. The discs 54–57 have magnetic projections 58, 59, 60, 61, 62, etc. thereon whose positions thereon correspond in binary form to the numeral "1" set forth in the second column of Table I. The numerals 0–9 disposed around the peripheries of the discs 54–57 in FIG. 8 represent the portions of these discs corresponding to such numerals. In other words, by observing the presence or absence of projections on the discs 54–57 for any given numeral in the group 0–9, it will be found that for a given numeral the presence of a projection corresponds to the numeral "1" in column 2 of Table I, whereas, the absence of a projection corresponds to "0" in the second column of Table I. For example, reading from left to right in FIG. 8, the numeral 8 is represented by the projection 59 followed by three blanks (projections omitted), which, upon reference to column 2 of Table I, it will be found corresponds to 1000. The positions of the discs 54–57 shown in FIG. 8 are the relative positions of these discs when assembled axially adjacent to each other to form a magnetic member 52, 52a, 52b or 52c.

In FIG. 7 a rotatable read-out member 63 of magnetic material and having a plurality of magnetic projections 64, 65, 66, etc. equal in number to the number of places of the binary code representing a digit times the number of members 52–52c (sixteen, in the embodiment shown), is mounted with its axis of rotation substantially parallel to the axis of rotation of the magnetic members 52–52c. The read-out member 63 is rotatable by a driving means 37 which may, for example, be an electric motor. The read-out member 63 may be constructed in the same manner as the read-out member 30 illustrated in FIG. 2, and the projections 64–66, etc. may be either unmagnetized or magnetized in the same polarity. It will be apparent that the space between the projections 64, 65, 66, etc. on the read-out member 63, as well as the space between the projections 58–62, etc. on the magnetic members 52–52c may be filled with a non-magnetic material, such as a synthetic resin, for the purpose of providing smooth exterior surfaces for the read-out member 63 and the magnetic members 52–52c.

A permanent magnet 67 is mounted adjacent the ends of the read-out member 63 and the magnetic members 52–52c so as to provide a magnetic field extending through these members. A read-out coil 68 is wound around the permanent magnet 67, and therefore, read-out signals of the type described above will be induced in the read-out coil 68 when the read-out member 63 is rotated by the driven means 37, projections 64, 65, 66, etc. varying the reluctance of the magnetic path through the read-out coil 68 as each projection 64, 65, 66, etc. moves past a magnetic projection 58, 59, etc. on the magnetic members 52–52c. However, due to the fact that places of the binary code are represented by the absence of the magnetic members 52–52c and due to the fact that projections 64, 65, 66, etc. will produce a relatively smaller or substantially no change in the reluctance of the magnetic path when it moves past a portion of a magnetic member on which a magnetic projection has been omitted, the output signals of the read-out coil 68 will differ from the output signals of the read-out coil 14 or 35 in that pulses will be produced only at times when the magnetic projections 64, 65, 66, etc. pass adjacent projections 58, 69, etc., which have been moved into the read-out position by the counter drive 53.

Although the embodiment illustrated in FIGS. 7 and 8 has the disadvantages mentioned above, it has the advantage that it is unnecessary to polarize individual areas on the magnetic members in accordance with a binary code.

Another embodiment of the invention is illustrated in FIGS. 9 and 10, the apparatus shown in FIGS. 9 and 10 being used together but being separately shown for clarity in illustration. It will be noted that in the embodiment of FIGS. 1 and 2 the magnetically polarized areas are polarized axially of the magnetic member. In the embodiment illustrated in FIGS. 9 and 10, the magnetized areas are polarized peripherally of the magnetic members 69–69c. The magnetic members 69–69c may be constructed in the same manner as the magnetic members 10–10c illustrated in FIG. 2, but the areas are polarized peripherally as indicated in FIG. 9, the directions of polarization corresponding to the directions set forth in the fourth column of Table I. The magnetic members 69–69c may be mechanically coupled in the same manner as the magnetic members described above and are rotatable by any suitable counter drive 70 which is responsive to the value of the quantity to be measured.

The preferred form of the read-out member for the magnetic members 69–69c shown in FIG. 9 is illustrated in FIG. 10. The read-out member 71 illustrated in FIG. 10 comprises a plurality of magnetic reproducing heads 72, 73, 74, etc. corresponding in number to the number of polarized areas on the magnetic member 69–69c which may be in read-out position at any given time. The reproducing heads 72, 73, 74, etc. have magnetic gaps 75, 76, 77, etc. therein which are axially and circumferentially displaced with respect to each other in the same manner as the projections 31, 32, 33, 34, etc. illustrated in FIG. 2. In other words, the magnetic gaps 75, 76, 77, etc. are arranged so that they may be brought successively adjacent magnetic polarized areas on the magnetic members 69–69c in read-out position, and therefore, the magnetic gaps are arranged in a spiral path around the periphery of the read-out member 71.

Serially connected read-out coils 78 and 79 encircle the magnetic reproducing heads 72, 73, 74, etc. and are connected to slip rings 80 and 81 mounted on a shaft 82 which is rotatable by a motor 83, the magnetic heads 72, 73, 74, etc. being mounted on the shaft 82 and being rotatable therewith.

The read-out member 71 is mounted adjacent the magnetic members 69–69c with a very small spacing between the read-out member 71 and the magnetic members 69–69c e.g. a few thousandths of an inch, and with the axis of rotation of the read-out member 71 substantially parallel to the axis of rotation of the magnetic members 69–69c. It will be apparent to those skilled in the art, from the foregoing description, that when the magnetic member 71 is rotated by the motor 83, read-out signals which are substantially the same as the read-out signals illustrated in the lower portion of FIG. 4 will be available at the leads 84 and 85 connected to the brushes 86 and 87 which ride on the slip rings 80 and 81.

Having thus described my invention with particular reference to the preferred form thereof and having shown and described certain modifications, it will be obvious to those skilled in the art to which the invention pertains, after understanding my invention, that various changes and other modifications may be made therein without departing from the spirit and scope of my invention, as defined by the claims appended thereto.

What is claimed as new and desired to be secured by Letters Patent is:

1. Counter apparatus comprising a rotatable member having a plurality of magnetically discontinuous areas spaced about the periphery thereof, said areas being arranged in a predetermined pattern, a read-out coil, a rotatable read-out member having means for successively altering the magnetic characteristics of the paths between a predetermined one of said areas and said coil and means for producing a magnetic field extending through said read-out member, said areas and said coil.

2. Counter apparatus comprising a rotatable member having a plurality of magnetically polarized areas spaced about the periphery thereof, said areas being arranged in a predetermined pattern, a read-out coil mounted in the fields of said areas, and a rotatable read-out member having means for successively altering the magnetic characteristics of the paths between a predetermined one of said areas and said coil.

3. Counter apparatus comprising a rotatable member having a plurality of magnetically polarized areas disposed in spaced groups about the periphery thereof, the polariaztion of the areas in each group corresponding in binary form to a numeral, a read-out coil mounted in the fields of said areas, and a rotatable read-out member having means for successively altering the magnetic characteristics of the paths between a predetermined one of said areas and said coil.

4. Counter apparatus comprising a cylinder member rotatable about a predetermined axis, said cylinder member having axially spaced areas of different magnetic characteristics on the periphery thereof in predetermined patterns, said areas being arranged in peripherally spaced groups, means for rotating said cylinder member, a rotatable read-out member of magnetic material mounted adjacent said cylinder member with its axis of rotation substantially parallel to the axis of rotation of said cylinder member, said read-out member having peripherally discontinuous and axially and peripherally spaced portions and one of said members having means for producing a magnetic field, and a read-out coil mounted in the path of said magnetic field.

5. Counter apparatus comprising a cylinder rotatable about a predetermined axis, said cylinder having axially spaced magnetically polarized areas on the periphery thereof, said areas being arranged in peripherally spaced groups and being polarized in predetermined patterns in each group; means for rotating said cylinder, a rotatable read-out member of magnetic material mounted adjacent said cylinder with its axis of rotation substantially parallel to the axis of rotation of said cylinder, said read-out member having peripherally discontinuous and axially and peripherally spaced portions; and a read-out coil mounted in the path of the magnetic fields of said areas between said areas and said member.

6. Counter apparatus comprising a plurality of rotatable discs of magnetic material disposed axially of each other having a common axis of rotation and having radially extending projections thereon, said projections being arranged in peripherally spaced groups, each group corresponding in binary form to a numeral and each group representing a different numeral; means for rotating said discs; a rotatable read-out member having a plurality of projections of magnetic material, said member being mounted adjacent said discs with its axis of rotation substantially parallel to the axis of rotation of said discs, said last-mentioned projections being equal in number to the number of said discs and being axially spaced in substantially the same manner as said projections of said discs and said projections on said read-out member being angularly spaced about the axis of rotation of said read-out member, whereby as said read-out member is rotated the projections thereon are successively moved into positions immediately adjacent corresponding projections on said discs; a read-out coil; and means for producing a magnetic field extending through said coil and said projections of said discs and said read-out member.

7. Counter apparatus comprising a plurality of rotatable discs of magnetic material having a common axis of rotation and having radially extending projections thereon, said projections being arranged in peripherally and axially spaced groups, each group corresponding in binary form to a numeral and each group representing a different numeral than the next peripherally spaced group, said groups being mechanically coupled to cause each group to rotate stepwise through a portion of a revolution for each revolution of a next axially adjacent group; means for rotating said discs; a rotatable read-out member having a plurality of projections of magnetic material, said member being mounted adjacent said discs with its axis of rotation substantially parallel to the axis of rotation of said discs, said last-mentioned projections being equal in number to the number of said discs and being axially spaced in substantially the same manner as said projections of said discs and said projections on said read-out member being angularly spaced about the axis of rotation of said read-out member in a spiral, whereby as said read-out member is rotated the projections thereon are successively moved into positions immediately adjacent corresponding projections on said discs; means for rotating said read-out member at a speed which is relatively high with respect to the speed of rotation of said discs; means for producing a magnetic field extending axially of said discs and said read-out member; and a read-out coil magnetically coupled to said field producing means.

8. Counter apparatus comprising a rotatable cylinder having a predetermined axis of rotation and having axially spaced, magnetically polarized areas on the periphery thereof, said areas being arranged in peripherally spaced groups and the polarization of said areas in a group being in predetermined patterns, a rotatable read-out member comprising a plurality of read-out heads of magnetic material having gaps therein disposed axially of each other, said member being mounted adjacent said cylinders with its axis of rotation substantially parallel to the axis of rotation of said cylinder, said gaps being equal in number to the number of said areas in a group and being peripherally spaced with respect to each other, whereby as said read-out member is rotated the gaps are successively moved into positions immediately adjacent corresponding areas on said indicating cylinder, and at least one read-out coil magnetically coupled to said heads.

9. Counter apparatus comprising a plurality of rotatable, indicating cylinders having a common axis of rotation and each having peripherally, magnetically polarized areas on the periphery thereof, said areas being arranged in peripherally spaced groups and the polarization of said areas in a group corresponding in binary form to a numeral, each group on a cylinder representing a different numeral, a rotatable read-out member comprising a plurality of read-out heads of magnetic material having gaps therein, said member being mounted adjacent said cylinders with its axis of rotation substantially parallel to the axis of rotation of said cylinders, said gaps being equal in number to the number of said indicating cylinders times the number of said areas in a group and being axially spaced in substantially the same manner as said areas and said gaps also being angularly spaced about the axis of rotation of said read-out member in a spiral, whereby as said read-out member is rotated the gaps are successively moved into positions immediately adjacent corresponding areas on said indicating cylinders; and at least one read-out coil magnetically coupled to said heads.

10. Counter apparatus comprising a plurality of rotatable, number indicating cylinders having a common axis of rotation, each cylinder having numerals thereon spaced around the periphery thereof and each cylinder having axially spaced, magnetically polarized areas on the periphery thereof, said areas being arranged in groups with the groups spaced around the periphery of a cylinder in substantially the same manner as said numerals, the polarization of said areas in a group corresponding in binary form to a numeral, each group on a cylinder representing a different numeral, said cylinders being mechanically coupled to cause each cylinder to rotate stepwise through a portion of a revolution for each revolution of a next adjacent cylinder; means for rotating said cylinders; a rotatable read-out member comprising a plurality of read-out heads of magnetic material having gaps therein, said member being mounted adjacent said cylinders with its axis of rotation substantially parallel to the axis of rotation of said cylinders, said gaps being equal in number to the number of said indicating cylinders times the number of said areas in a group and being axially spaced in substantially the same manner as said areas and said gaps also being angularly spaced about the axis of rotation of said read-out cylinder in a spiral, whereby as said read-out member is rotated the gaps are successively moved into positions immediately adjacent corresponding areas on said indicating cylinders; means for rotating said read-out member at a speed which is relatively high with respect to the speed of rotation of said indicating cylinders; and at least one read-out coil magnetically coupled to said heads.

11. Counter apparatus comprising a plurality of rotatable cylinders having a common axis of rotation, each cylinder having axially spaced magnetically polarized areas on the periphery thereof, said areas being arranged in groups with the groups spaced around the periphery of a cylinder, the polarization of said areas in a group corresponding in binary form to a numeral, each group on a cylinder representing a different numeral, said cylinders being mechanically coupled to cause each cylinder to rotate stepwise through a portion of a revolution for each revolution of a next adjacent cylinder; means for rotating said cylinders; a rotatable read-out member of magnetic material mounted adjacent said cylinders with its axis of rotation substantially parallel to the axis of rotation of said cylinders, said read-out member having a plurality of projections of magnetic material extending radially outward therefrom, said projections being equal in number to the number of said indicating cylinders times the number of said areas in a group and being axially spaced in substantially the same manner as said areas, said projections also being angularly spaced about the axis of rotation of said read-out member in a spiral, whereby as said read-out member is rotated the projections are successively moved into positions immediately adjacent corresponding areas on said indicating cylinders; and a read-out coil mounted adjacent said read-out member and in path of the magnetic fields of said areas.

12. Counter apparatus comprising a plurality of rotatable, number indicating cylinders having a common axis of rotation, each cylinder having numerals thereon spaced around the periphery thereof and each cylinder having axially spaced magnetically polarized areas on the periphery thereof, said areas being arranged in groups with the groups spaced around the periphery of a cylinder in substantially the same manner as said numerals, the polarization of said areas in a group corresponding in binary form to a numeral, each group on a cylinder representing a different numeral, said cylinders being mechanically coupled to cause each cylinder to rotate stepwise through a portion of a revolution for each revolution of a next adjacent cylinder; electromagnetic means for rotating said cylinders; a rotatable read-out cylinder of magnetic material mounted adjacent said cylinders with its axis of rotation substantially parallel to the axis of rotation of said cylinders, said read-out cylinder having a plurality of projections of magnetic material extending radially outward therefrom, said projections being equal in number to the number of said indicating cylinders times the number of said areas in a group and being axially spaced in substantially the same manner as said areas, said projections also being angularly spaced about the axis of rotation of said read-out cylinder in a spiral, whereby as said read-out cylinder is rotated the projections are successively moved into positions immediately adjacent corresponding areas on said indicating cylinders; means for rotating said read-out cylinder at a speed which is relatively high with respect to the speed of rotation of said indicating cylinders; and a stationary read-out coil mounted co-axially with said read-out cylinder.

13. In combination, a magnetic member having a plurality of groups of spaced magnetized portions, the portions of each group being arranged in accordance with a predetermined code, a magnetic core member having at least one winding thereon, said core member being mounted adjacent said magnetic member and in the magnetic field of said portions in predetermined relative positions of said members whereby the magnetic flux to which said core member is subjected by a portion is dependent upon the relative positions of said members, and further means for successively varying the magnetic flux in said core member.

14. In combination, a plurality of magnetic core members each having a winding thereon, first means for producing magnetic fields within said cores comprising a magnetic member having a plurality of spaced magnetized portions arranged in accordance with a predetermined code, said core members and said magnetic member being adjacent to each other and being movable with respect to each other, whereby the magnetic fields to which said cores are subjected are dependent upon their relative positions, and second means for successively varying the magnetic fields through said core members for thereby generating voltages in the windings of said core members dependent upon the relative positions of said core members and said magnetic member.

15. In measuring apparatus having a movable member movable in accordance with the value of a condition to be measured, a magnetic member movable with said movable member, said magnetic member having a group of spaced portions having magnetic characteristics different from the magnetic characteristics of the adjacent areas of said magnetic member, said portions being spaced from each other in a first predetermined direction and said magnetic characteristics of said portions of said group being selected in accordance with a predetermined code related to the position of said magnetic member, read-out means mounted adjacent said magnetic member and having a group of spaced portions corresponding in number to at least the number of said spaced portions in said first mentioned group and having magnetic characteristics different from the magnetic characteristics of adjacent areas of said read-out means, said portions of said read-out means having a spacing in said first predetermined direction corresponding substantially to the spacing of said first mentioned portions in said first direction, the portions of one said group also being spaced with respect to each other in a second predetermined direction extending transversely to said first predetermined direction, means for producing relative movement between said magnetic member and said read-out means and thereby causing said portions of said magnetic member and said portions of said read-out means to pass successively in close proximity to each other, and a read-out coil magnetically coupled to said portions.

16. In measuring apparatus having a movable member movable in accordance with the value of a condition to be measured, a rotatable magnetic member rotatable by said movable member, said magnetic member having a group of spaced portions having magnetic characteristics different from the magnetic characteristics of the adjacent areas of said magnetic member, said portions being spaced from each other in a first predetermined direction and said magnetic characteristics of said portions of said group being selected in accordance with a predetermined code related to the position of said magnetic member, a rotatable read-out member mounted adjacent said magnetic member and having a group of spaced portions corresponding in number to at least the number of said spaced portions in said first mentioned group and having magnetic characteristics different from the magnetic characteristics of adjacent areas of said read-out member, said portions of said read-out member having a spacing in said first predetermined direction corresponding substantially to the spacing of said first mentioned portions in said first direction, the portions of one of said group also being spaced with respect to each other in a second predetermined direction extending transversely to said first predetermined direction, means for producing rotation of one of said magnetic and said read-out members and thereby causing said portions of said magnetic member and said portions of said read-out member to pass successively in close proximity to each other, and a read-out coil magnetically coupled to said portions.

17. In combination, a plurality of magnetic core members each having at least one winding thereon, first means for producing magnetic fields within said cores including a flux emanating member having a plurality of magnetic flux emanating areas arranged in accordance with a predetermined code, said core members and said flux emanating member being adjacent to each other and being susceptible of relative displacements whereby said core members are positioned with respect to certain of said areas dependent upon said relative displacements, and second means for inducing successive variable magnetic flux through said core members thereby generating signals in the respective windings on said core members dependent upon the relative positions of said core members and said flux emanating member.

18. In combination, a plurality of magnetic core members each having at least one winding thereon, first means for producing magnetic fields including a flux emanating member having a plurality of magnetic flux emanating areas arranged in a coded pattern; said core members and said flux emanating member being adjacent to each other and being movable with respect to each other whereby the magnetic fields to which said core members are subjected are dependent upon the relative displacements of said core members and said flux emanating member; and second means for successively producing variations in the magnetic flux through said core members, dependent upon the relative positions of said core members and said flux emanating member, thereby generating voltages in the windings on said core members dependent upon the relative positions of said core members and said flux emanating member.

References Cited in the file of this patent

UNITED STATES PATENTS

| | | |
|---|---|---|
| 2,344,254 | Leathers et al. | Mar. 14, 1944 |
| 2,480,981 | Thierfelder | Sept. 6, 1949 |
| 2,722,676 | Begun | Nov. 1, 1955 |
| 2,782,989 | Knox | Feb. 26, 1957 |
| 2,827,626 | De Motte | Mar. 18, 1958 |
| 2,855,585 | Quinby | Oct. 7, 1958 |
| 2,869,782 | Leonard | Jan. 20, 1959 |
| 2,901,727 | Henn-Collins | Aug. 25, 1959 |